(12) United States Patent
Oliver et al.

(10) Patent No.: US 6,580,838 B2
(45) Date of Patent: Jun. 17, 2003

(54) VIRTUAL ZERO TASK TIME SPEECH AND VOICE RECOGNITION MULTIFUNCTIONING DEVICE

(75) Inventors: Thomas C Oliver, Windsor, CO (US); Barbara A. Hackbarth Mueller, Windsor, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 25 days.

(21) Appl. No.: 09/920,389

(22) Filed: Aug. 1, 2001

(65) Prior Publication Data

US 2002/0013701 A1 Jan. 31, 2002

Related U.S. Application Data

(63) Continuation-in-part of application No. 09/219,972, filed on Dec. 23, 1998, now Pat. No. 6,295,391.

(51) Int. Cl.[7] ................................................. G06K 9/22
(52) U.S. Cl. ........................ 382/313; 382/312; 382/321
(58) Field of Search ............................... 382/313, 312, 382/321; 707/503; 704/270; 348/701

(56) References Cited

U.S. PATENT DOCUMENTS

| 5,737,491 A | * | 4/1998 | Allen et al. ............... 395/2.79 |
| 5,818,930 A | * | 10/1998 | Mark ......................... 379/444 |
| 5,877,819 A | * | 3/1999 | Branson ..................... 348/701 |
| 5,924,068 A | * | 7/1999 | Richard et al. ............. 704/260 |
| 6,157,935 A | * | 12/2000 | Tran et al. ................... 707/503 |

FOREIGN PATENT DOCUMENTS

| JP | 405307790 | * | 11/1993 | ........... G11B/15/02 |
| JP | 407015353 | * | 1/1995 | ........... H03M/13/00 |

* cited by examiner

*Primary Examiner*—Anh Hong Do

(57) ABSTRACT

A system for automatically routing data captured by multifunctioning devices, such as scanners through speech and voice recognition. After capturing an image or document with the device, speech disposition commands are made by a user speaking into a voice pickup component in the device to control the disposition of the captured image or document. The user uses the commands to program various tasks and operations and build more powerful commands. The system executes and learns commands with multitasking. As one of the tasks, the system has a training function which can be used to prompt for additional information for incomplete commands. The system keeps previously performed commands and can use these commands for parameters to complete an incomplete command.

12 Claims, 14 Drawing Sheets

VIRTUAL ZERO TASK TIME SPEECH AND VOICE RECOGNITION MULTIFUNCTIONING DEVICE

CROSS REFERENCE TO RELATED APPLICATIONS

This application is a continuation-in-part of application Ser. No. 09/219,972 of Rudd, et al. filed Dec. 23, 1998 entitled Automatic Data Routing Via Voice Command Annotation now U.S. Pat. No. 6,295,391.

TECHNICAL FIELD

This invention relates to devices such as document scanners, digital cameras, personal digital assistants, laptop computers, and any other device that stores data and uploads or copies the data to a host computer. Even more particularly, the invention relates to using voice and speech recognition for performing commands on the data in a multiprocessing environment.

BACKGROUND OF THE INVENTION

Many devices, such as digital cameras, personal digital assistants, laptop computers, and hand held document scanners, have the ability to collect many different images or documents from a variety of sources. In many cases the user may want to accomplish different tasks with each image or document captured. Some may be faxed or e-mailed to business associates or friends. Others may become part of a word processing document. Still others may need to be stored in a specific location or immediately printed. Normally, such devices are periodically connected to a host computer, and the collected image data files or document data files are copied to the host computer from the device as a group, or copied individually to the host computer. In either case, the user must look at each specific image data file or document data file after copying and take action to have that image or document processed or sent to the right place: save image A in this format here; save document B in that format there; attach image C to an e-mail message; fax document D to a business associate, etc. This can be a very time consuming process, especially if a large number of image data files and document data files have been captured. Also, it can become time consuming if the device has to be watched and continuously monitored. The time problem is compounded if commands must be repeated because the failure or problem is undiscovered until after the operation attempts to execute and it cannot execute for numerous reasons. In addition, if the images and documents are collected over an extended period of time, such as on a business trip, by the time the individual copies them to the host computer for processing and routing, the individual may have difficulty remembering exactly what action was intended for each one. The best time, in most cases, for an individual to determine the disposition of a captured image or document is at the time of capture.

It is thus apparent that there is a need in the art for an improved method or apparatus which will operate as a background process in a multitasking fashion that allows teaching and executing of commands that enable a user to annotate a captured image or document, at the time of capture, with speech disposition commands for processing and disposing of the image or document, so that the image or document will automatically be processed and disposed of according to the speech disposition commands stored in a voice annotation file or a speech disposition command file. These commands are executed by the device or the host computer upon copying, or uploading, the image data file or document data file and voice annotation file or a speech disposition command file to a host computer. The present invention meets these and other needs in the art.

SUMMARY OF THE INVENTION

It is an aspect of the present invention to use a voice pickup component integrated into a device to enable disposition commands to be made by voice and stored in a voice annotation file or a speech disposition command file for each image or document captured.

Another aspect of the invention is to operate in a multitasking mode that simultaneously executes and learns commands associated with the speech disposition commands in the speech disposition command file allowing for hands free operation.

A further aspect of the invention is to store all the commands issued by a user that will enable the device to make suggestions to the user based on the user's past profile.

The above and other aspects of the invention are accomplished in devices that capture images or documents and store them as image data files or document data files in an internal memory. Prior to capturing the image or document, the device can execute speech control commands and speech disposition commands, such as a "memorize" speech disposition command or a simple "email" or "fax" message. These commands are used to create new commands or subcommands. Also, at the time the image or document is captured, the devices can receive speech disposition commands from the user that will govern the processing and disposition of the image data files or document data files after copying or uploading them to a host computer. Voice input is ideal for small devices which may not have enough space to provide any other type of user interface. Also, voice input is ideal for devices where the user does not want to use buttons, a mouse, or deal with user interfaces, but rather work in a hands free environment or where the device supports multitasking which means tasks are executed in parallel and in the background.

For example, after scanning a document with a portable hand held document scanner, the user may make a first speech disposition command, such as "fax" or "e-mail" or "print and save", and then make a second speech disposition command, such as "memorize Fran Bisco's fax 777-444-4444" by speaking into a voice pickup component, typically a microphone, in the portable scanner. The voice is converted into a recognition pattern, which is then compared to a predetermined set of recognition patterns stored in internal memory. If there is no match, then the device outputs a message to the user that the speech disposition command is not valid.

If there is a partial match, then the device outputs a different message to the user indicating that the speech disposition command needs to be modified, such as the command is missing a parameter or that the parameter does not make sense for this specific command. The device may offer some suggestions based on past commands executed.

There are various levels of sophistication inherent in different embodiments of the invention. In one embodiment, when the file transfer software or the device processes a speech disposition command such as "e-mail", the user may designate the email address based on an earlier speech disposition command or if omitted the user may be prompted to provide the e-mail address the user wants the image data file or document data file sent to. When the e-mail command is complete, the file transfer software then accesses the e-mail utility in the host computer or the device accesses its e-mail utility, and the document data file associated with the speech disposition command is e-mailed. Once all the commands in the voice annotation file or speech disposition command file are executed, the file is normally deleted.

In another embodiment of the invention a device is trained to recognize the user's spoken commands through speech and voice analysis software. In training mode, the voice analysis component of the software is accessed. The speech and voice analysis software may be located within the device, or located on a host computer system and accessed by the device while tethered to the host computer system.

For example, if using the speech and voice analysis software in the training mode, the user would access a predetermined list of the functions that can be executed by the file transfer software or the device with a speech disposition command. Command one, for example, may represent a set of instructions for performing a print function of an image data file or document data file. The syntax could be "print x copies on printername". In selecting command one for training and analysis, the user would be prompted by the speech and voice analysis software to choose a word that the user wants to use to invoke the set of instructions for the print function of command one. The user may be prompted to make printername its default printer. The user may also be prompted to repeat the chosen words a number of times. A logical choice would be to choose the word "print", but any word chosen by the user not already being used for a function could be employed. Each repetition of the word "print" is picked up by the device and analyzed by the speech and voice analysis software to develop a recognition pattern to encompass the variations and inflections in the user's voice in speaking the word "print" for the print command. The recognition patterns in the function recognition table have command numbers or command text that are linked to the predetermined sets of instructions for the various functions, which are also stored in memory in the host computer or the device. This embodiment would enable foreign languages to be utilized for the speech disposition command words, since the set of instructions for a function are tied to the command number or command text, and the user's word choice, and subsequent training and voice analysis of that word choice.

In still another embodiment of the invention the recognition patterns for all the commands issued are stored in a memory database that is accessed when a recognition pattern associated with a speech disposition command, voice control command or voice annotation command does not match a recognition pattern in the function recognition table.

DESCRIPTION OF THE DRAWINGS

The above and other aspects, features, and advantages of the invention will be better understood by reading the following more particular description of the invention, presented in conjunction with the following drawings, wherein.

BEST MODE FOR CARRYING OUT THE INVENTION

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
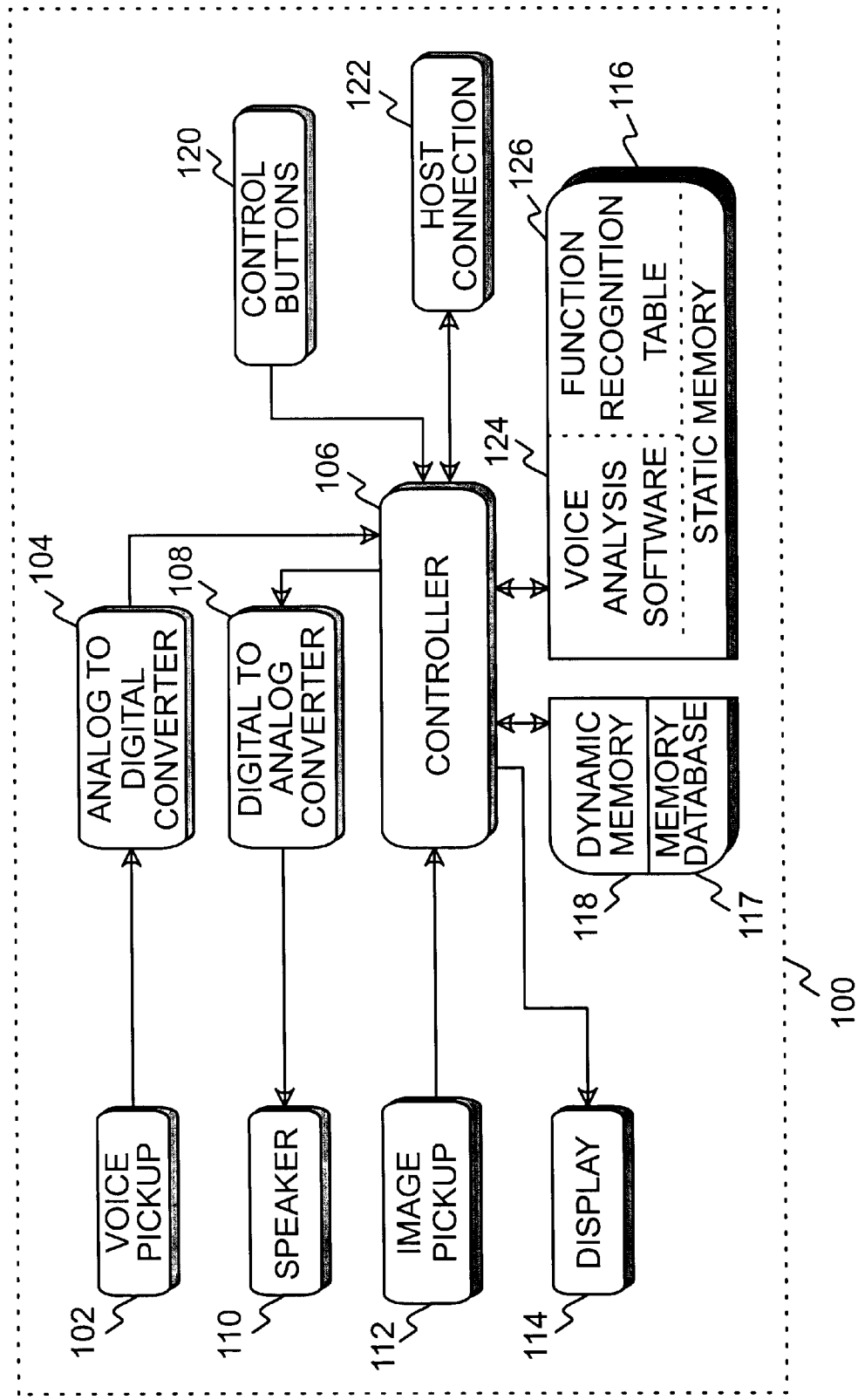
FIG. 1 shows a block diagram of a device of the present invention.

FIG. 1 shows a block diagram of a device of the present invention. Referring now to FIG. 1 device 100 is powered on by pressing a power on button, which is one of several control buttons 120 on device 100. Device 100 receives its power from internal batteries (not shown in FIG. 1), or alternatively through a power cable connected to device 100 and plugged into a power source (also not shown in FIG. 1). Device 100 could also be powered on through a voice command eliminating the need for buttons.

Distinguishing between the three different purposes for voice input, in the preferred embodiment, is accomplished without the use of buttons. By eliminating the use of buttons on the capturing device, the device can be made smaller and can be operated hands-free. A voice command is used for making a speech disposition command, a voice control command or for making a voice annotation.

The user operates device 100 such that image pickup component 112 captures an image or document. For a portable hand held document scanner, the user would move the scanner such that image pickup component 112 comes in contact with a portion or all of the surface of the document to be scanned. Image pickup component 112 optically reads sample points from the surface of the document and generates a grey scale value for each point sampled. Controller 106 receives the grey scale values for the sample points and assembles them into an image array. The result may be output to display 114 connected to controller 106 showing a visual representation of the surface of the scanned document. Controller 106 may also convert the grey scale values to binary form for display or for storage. The image array, in either grey scale or binary form, is passed from controller 106 and stored as a document data file in static memory 116. One skilled in the art will recognize that the foregoing is also applicable to a device capable of capturing a color image utilizing RGB values for the sample points.

Speech disposition commands for either document data files or image data files are given by a user speaking in proximity to voice pickup component 102. Voice pickup component 102 converts the user's speech into an analog signal. Connected to voice pickup component 102 is an analog-to-digital converter 104, which converts the analog signal generated by voice pickup component 102 into a digital signal. The digital signal is sent by analog-to-digital converter 104 to controller 106, which stores the signal in dynamic memory 118. Within dynamic memory 118, is a memory database 117 that stores the speech disposition commands issued by the user. The memory database 117 is utilized to make suggestions with speech disposition commands and to help customize the device for the user. The memory database is only limited by size constraints and could be implemented as a circular queue or similar data structure that overwrites previous commands when the size limit is reached. One skilled in the art will recognize that any other suitable method for implementing the memory database could be used in the present invention. The memory database can reside on either host 200 (FIG. 2) or device 100. Its location depends solely on how the present invention is used Thus, in the preferred embodiment of the invention, a controller 106 accesses speech and voice analysis software 124 stored in static memory 116. The controller 106 also functions as a central processing unit (CPU) for the device. It is apparent that the device could have a separate CPU or separate digital signal processor to perform separate but similar functions provided by controller 106. Speech and voice analysis software 124 performs a series of frequency domain transforms on the digital signal stored in dynamic memory 118 to generate a recognition pattern, which is a spectral transform. One skilled in the art will recognize that any other suitable method for recognizing voice patterns could be used in the present invention instead of spectral transforms.

The recognition pattern is compared to recognition patterns (also spectral transforms) stored in static memory 116 in function recognition table 126. In another embodiment of the invention, function recognition table 126 is not stored in device 100, but is stored instead in host computer system 200.

If there is a match, then controller 106 stores the command number or command text, found in function recognition table 126 and associated with the matched recognition pattern in dynamic memory 118, in a speech disposition command file. If there is no match, then the device enters a correction mode to assist the user with modification of the speech disposition command. Controller 106 processes previous speech disposition commands issued by the user and stored in memory database 117. If the device still cannot find a match then the controller 106 indicates to the user that the speech disposition command given is not valid. This may be done by sending a message for output on display 114. Or, an audible message, consisting of beeps or words, may be output to the user. Digital-to-analog converter 108 converts the digital output signal from controller 106 into an analog signal, and speaker 110 converts the analog signal into audio output.

After capturing a document with device 100, in the preferred embodiment of the invention, the user may speak into voice pickup component 102 to make a speech disposition command, a voice annotation, or issue a voice control command. Alternatively, distinguishing between the three different purposes for voice input, in one embodiment of the invention, the user presses and holds down one of the control buttons 120 before speaking. One of the control buttons 120 is for making speech disposition commands, and another of the control buttons 120 is for making voice annotations. Voice input without either of these control buttons 120 pressed will be processed as a voice control command input. In either case, pressing either of the control buttons 120 sends button down input to controller 106, indicating that the following stream of voice input is either a speech disposition command or a voice annotation, depending upon which of the control buttons 120 was pressed, but not a voice control command input. After the user finishes speaking, the user releases the one of the control buttons 120 that was pressed. This sends button up input to controller 106, which marks the end of the voice input for either the speech disposition command or the voice annotation. The stream of voice input that was captured is stored either as a speech disposition command file or as a voice annotation file, depending upon which one of the control buttons 120 were pressed, and is associated with the captured image data file or document data file and stored in static memory 116 in device 100. One method of associating the image data file, or document data file, with an associated speech disposition command file or a voice annotation file is to give the files the same file name, but different file extensions. Multiple speech disposition commands for one image data file or one document data file may be stored in one speech disposition command file. Alternatively, multiple speech disposition command files may be associated with one image data file or one document data file. There could also be one of the control buttons 120 that the user would press to receive voice control commands.

In another embodiment of the invention, there is a voice control command for making a speech disposition command, and a voice control command for making a voice annotation. After issuing either voice control command, the following stream of voice input is captured and stored as either a speech disposition command file or as a voice annotation file, and associated with the image data file or document data file. A speech disposition command file contains at least one speech disposition command. A voice annotation file annotates the captured image and may contain at least one speech disposition command within the file. The processing of these two types of files is handled similarly, therefore, the present invention does not distinguish between them. When the user stops speaking for more than a predetermined period of time, such as between two to five seconds, the device interprets such predetermined period of absence of voice input as marking the end of the stream of voice input.

Upon receiving voice input of any type in voice pickup component 102, the voice input is converted to an analog signal. Analog-to-digital converter 104 converts the analog signal generated by voice pickup component 102 into a digital signal and sends the digital signal to controller 106. Controller 106 either processes the digital signal as a voice control command input, or processes and stores the digital signal in a speech disposition command file or in a voice annotation file in static memory 116, associating the image data file or document data file with the appropriate type of file.

The user may request that device 100 play back the contents of a speech disposition command file or a voice annotation file. Controller 106 may retrieve the digital signal and output digital audio. Alternatively, controller 106 retrieves either file requested from static memory 116, passes it to digital-to-analog converter 108, which converts the digital signal stored in the file to an analog signal. The analog signal is passed to speaker 110, which generates audio output. In addition, a particular set of instructions for a command may send audible output to the user to acknowledge receipt of the command utilizing either digital-to-analog converter 108 and speaker 110 or direct digital output, acknowledge the command through a print log that prints a list of the complete and incomplete commands issued by the user, or acknowledge the command by illuminating a light emitting diode (LED) (not shown in FIG. 1).

Image data files, document data files, voice annotation files, and speech disposition command files, may be copied to another device, such as host computer system 200 (FIG. 2) through host connection 122, which is connected to controller 106.

The device 100 is multifunctioning (multiprocessing). It is capable of simultaneously learning, being trained to execute and learn, and executing speech disposition commands. This multiprocessing is accomplished by the device continuously operating in an active listening state to process speech disposition commands, voice control commands or voice annotation data. The device operates in a dual training and execution mode. In training mode the device accepts multiple voice inputs to develop a command for later execution. Execution mode further comprises a state of learning and execution.

In execution mode, the device is capable of executing a voice control command such as power on, a speech disposition command such as scan document, or a voice annotation to annotate a document. The device can also simultaneously process execution commands if a first speech disposition command is for learning such as using a variation of the "memorize" command and a second speech disposition command is for operating on a document. Learning mode serves to build up the memory database 117 so that the memory database can be used to correct incomplete or incorrect commands or to increase the effectiveness of the device.

The multiprocessing is accomplished by a controller 106, that is capable of performing multiple tasks simultaneously such as performing multiple speech disposition commands like faxing and emailing concurrently. The controller must be capable of periodically being interrupted to handle incoming voice inputs in training mode, while the processing of an execution command has started, so that if the execution is restarted, it is restarted where it left off. The controller 116 can use one of various means for implementing multiprocessing known in the art. Similarly, processing speech disposition commands on the host computer is easily accomplished by using a host computer that supports multiprocessing which is also well known in the art.

Figure 2:
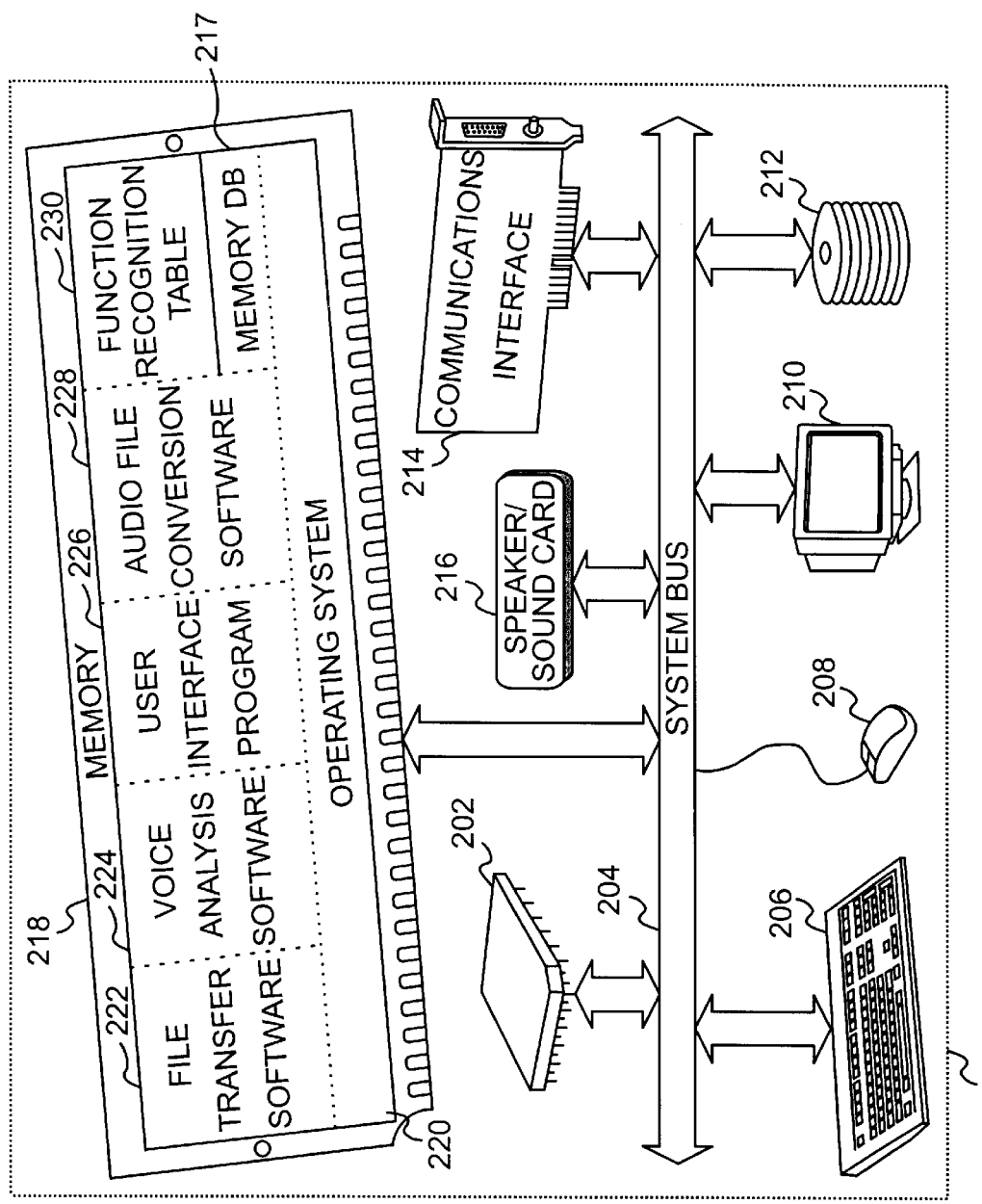
FIG. 2 shows a block diagram of a host computer system in communication with a device of the present invention.

FIG. 2 shows a block diagram of a host computer system in communication with a device of the present invention. Referring now to FIG. 2, host computer system 200 contains a processing element 202. Processing element 202 communicates to other elements of host computer system 200 over a system bus 204. A keyboard 206 allows a user to input information into host computer system 200 and a graphics display 210 allows host computer system 200 to output information to the user. A mouse 208 is also used to input information, and a storage device 212 is used to store data and programs within host computer system 200. Communications interface 214, also connected to system bus 204, receives information from host connection 122 of device 100 (FIG. 1). Speaker/sound card 216, connected to system bus 204, outputs audio information to the user. Some host computer systems may not have a sound card, in which case the speaker is driven only by software. A memory 218, also attached to system bus 204, contains an operating system 220, file transfer software 222, speech and voice analysis software 224, user interface program 226, audio file conversion software 228, memory database 217, and function recognition table 230. In another embodiment of the invention, neither function recognition table 230 nor memory database 217 are stored in host computer system 200, but is instead stored in device 100.

File transfer software 222 receives image data files, document data files, speech disposition command files, and voice annotation files copied from device 100 through host connection 122 (FIG. 1), through communications interface 214 and over system bus 204, and saves them in storage device 212. File transfer software 222 then begins processing all speech disposition command files copied to storage device 212.

When the speech disposition command file is in a WAV format, file transfer software 222 first processes the speech disposition command file to generate a recognition pattern for each of the commands it contains. File transfer software 222 compares the recognition patterns from the speech disposition command file with the recognition patterns stored in function recognition table 230. In addition, file transfer software compares the recognition patterns with the recognition patterns stored in memory database 217. When a match is found, file transfer software 222 then begins executing the set of instructions associated with the command number or command text for the recognition pattern found in function recognition table 230. When device 100 performs the speech analysis of the speech disposition command input, the command number or command text from the copied speech disposition command file is accessed by file transfer software 222 and the corresponding set of instructions are executed.

User interface program 226 allows the user to select an image data file or document data file having a voice annotation file. Audio file conversion software 228 converts the voice annotation file to an audio file format recognizable by speaker/sound card 216. Speaker/sound card 216 outputs the audio information to the user. After hearing the audio information, the user may choose to view the image data file or document data file. If so, user interface program 226 is suspended, the application program associated with the image data file or document data file is called, and the image data file is displayed in graphics display 210.

In the preferred embodiment of the invention, speech and voice analysis software 124 is used by a user to train device 100 to recognize the user's voice in any language. The user accesses speech and voice analysis software 124 and selects a particular function to train, to be represented by a word chosen by the user to invoke the function. The user then repeats the word to invoke the function a number of times. The word most likely to be chosen by the user is the word, in whatever language the user speaks, that is equivalent or closest to the particular function chosen. The user's repetition of the word for the function is captured by voice pickup component 102 (FIG. 1), is processed in device 100 into a digital signal.

Speech and voice analysis software 124 develops a recognition pattern based on a combination of each sample signal to encompass the variations and inflections in the user's voice in speaking the word chosen to invoke the function. This process is repeated for each of the predetermined functions that can be used for issuing a speech disposition command with device 100. The recognition patterns established for all the words chosen for training are stored in static memory 116 in function recognition table 126 and associated with a unique command number or command text. Depending upon the embodiment of the invention, the function recognition table for speech disposition commands may be uploaded to host computer system 200 from device 100.

For the embodiment of the invention where a host computer is used, speech and voice analysis software 224 is used by a user to train device 100 to recognize the user's voice in any language. Device 100 is first connected to host computer system 200. The user then accesses speech and voice analysis software 224 and selects a particular function to train, to be represented by a word chosen by the user to invoke the function. The user then repeats the word chosen by the user to invoke the function a number of times. The word most likely to be chosen by the user is the word, in whatever language the user speaks, that is equivalent or closest to the particular function chosen. The user's repetition of the word for the function is captured by voice pickup component 102 (FIG. 1), is processed in device 100 into a digital signal, and transferred via host connection 122 to communications interface 214. Communications interface 214 transfers each digital signal via system bus 204 to memory 218, where speech and voice analysis software 224 analyzes each digital signal. Speech and voice analysis software 224 develops a recognition pattern based on a combination of each sample signal to encompass the variations and inflections in the user's voice in speaking the word chosen to invoke the function. This process is repeated for each of the predetermined functions that can be used for issuing a speech disposition command with device 100. The recognition patterns established for all the words chosen for training are stored in function recognition table 230 and associated with a unique command number or command text. Depending upon the embodiment of the invention, the function recognition table for speech disposition commands may be downloaded from host computer system 200 to device 100, and stored in static memory 116, or kept in host computer system 200.

Figure 3:
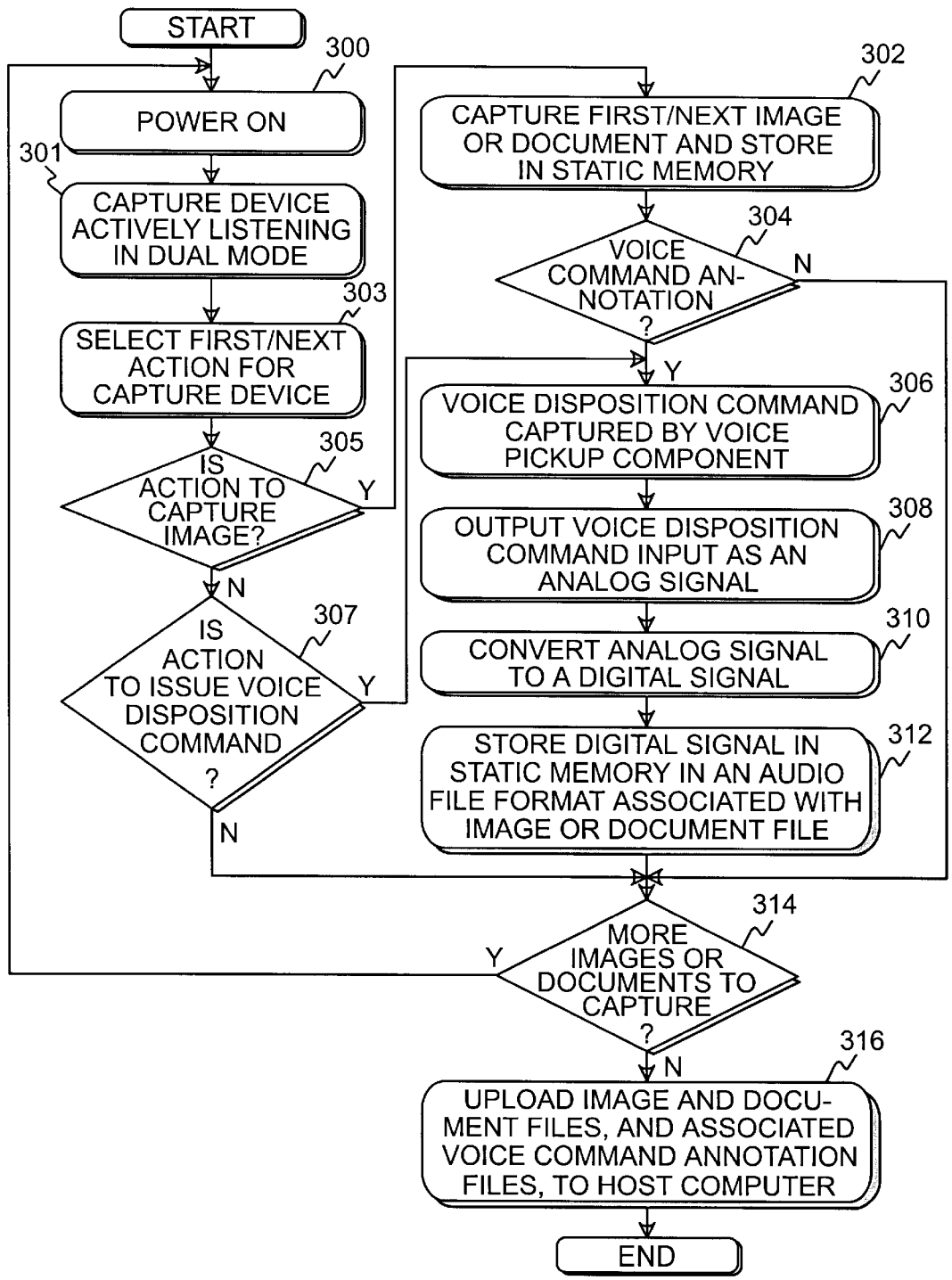
FIG. 3 shows a flow chart of an embodiment of a device of the present invention that does not perform speech analysis on speech disposition commands within the device.

FIG. 3 shows a flow chart of an embodiment of a device of the present invention that does not perform speech analysis on speech disposition commands within the device. Referring now to FIG. 3, in step 300 device 100 (FIG. 1) is powered on.

In step 301 the device automatically enters a dual learning and executing mode. In learning mode, the device is actively listening for new commands. For example, if the user should tell the device "memorize email address for Joe Smith, joe_smith@scanner.com". The device is now capable of sending email to Joe Smith because it just learned of Joe Smith's email address. In execution mode, the device can execute any of the core commands or subcommands that the device has previously learned. The device is capable of learning at anytime, even if it is concurrently executing a different command. The device is multi-tasking in that it can operate in its dual mode and execute and learn commands at the same time. In learning mode, the device is building memory database 117 in device 100 or memory database 217 in host computer's operating system 220 (FIG. 2) used for correcting and modifying speech disposition commands.

In step 303, the device receives input from the user as to the first or next action to be performed by the device. Step 305 determines if the action requested by the user is to capture an image or document. If the action is to capture an image or document, control transfers to step 302. In step 302 a first image or document is captured with device 100 and stored in static memory 116 (FIG. 1) as an image data file or a document data file.

Step 304 determines if an indication is received in controller 106 (FIG. 1) that a speech disposition command is to be made for the image data file or document data file stored in step 302. Such an indication could be made by controller 106 receiving button down input from one of the control buttons 120 (FIG. 1) for speech disposition commands. Or, a voice control command input could be received by controller 106 wherein the voice control command indicates the start of a speech disposition command.

If an indication for making a speech disposition command is received in step 304, then in step 306 voice pickup component 102 (FIG. 1) captures the speech disposition command input. In step 308 voice pickup component 102 outputs the speech disposition command input as an analog signal to analog-to-digital converter 104. In step 310, analog-to-digital converter 104 converts the analog signal to a digital signal, and outputs the digital signal to controller 106. In step 312 controller 106 stores the digital signal in static memory 116 in an audio file format, such as a WAV file. The WAV file, and the image data file or document data file for which the speech disposition command was made, are associated with each other. One way of making this association is to give both files the same file name, but different file extensions. Since the same image data file or document data file may have both a voice annotation file and a speech disposition command file, the voice annotation file would have a different file extension from the speech disposition command file, but all three would have the same base file name. Multiple speech disposition command files may be associated with one image data file or one document data file by adding an extension to the file extension, such as "???????.WAV.ONE", or adding a parameter to the file extension, such as "???????.WAV1".

Step 314 determines if an indication is received in controller 106 for capturing another image or document. If in step 314 no indication is received in controller 106 for capturing another image or document, then in step 316 the captured image data files, document data files, voice annotation files, and speech disposition command files are copied from device 100 to host computer system 200, over an established connection which utilizes host connection 122 (FIG. 1) and communications interface 214 (FIG. 2). Such a connection may be through a wire cable or an infrared beam, or any other suitable connection. All the files could be copied, or just those files individually selected by the user. Whenever an image data file or document data file is copied, any associated voice annotation files or speech disposition command files are automatically copied with the image data file or document data file. After copying files to host computer system 200, device 100 is powered off and its operation ends. One skilled in the art will recognize that a considerable amount of time may pass between steps 314 and 316, such as when a user is on a trip capturing images or documents, and then travels home, and then begins copying data to host computer system 200. If such an indication is received in step 314, then control returns to step 301 where the device is ready to receive a speech disposition command for learning, thus, building up the memory database, executing a previously learned speech disposition command, executing a speech disposition command to process the next image or document that is ready to be captured and stored.

If an indication is not received in step 304 that a speech disposition command is to be made for the image data file or document data file stored in step 302, then control passes to step 314.

If in step 305 the action is not to capture an image, then control passes to step 307. Step 307 determines if the action is to issue a speech disposition command. If the action is to issue the speech disposition command, then control passes to step 306. If not, then control passes to step 314.

Figure 4A:
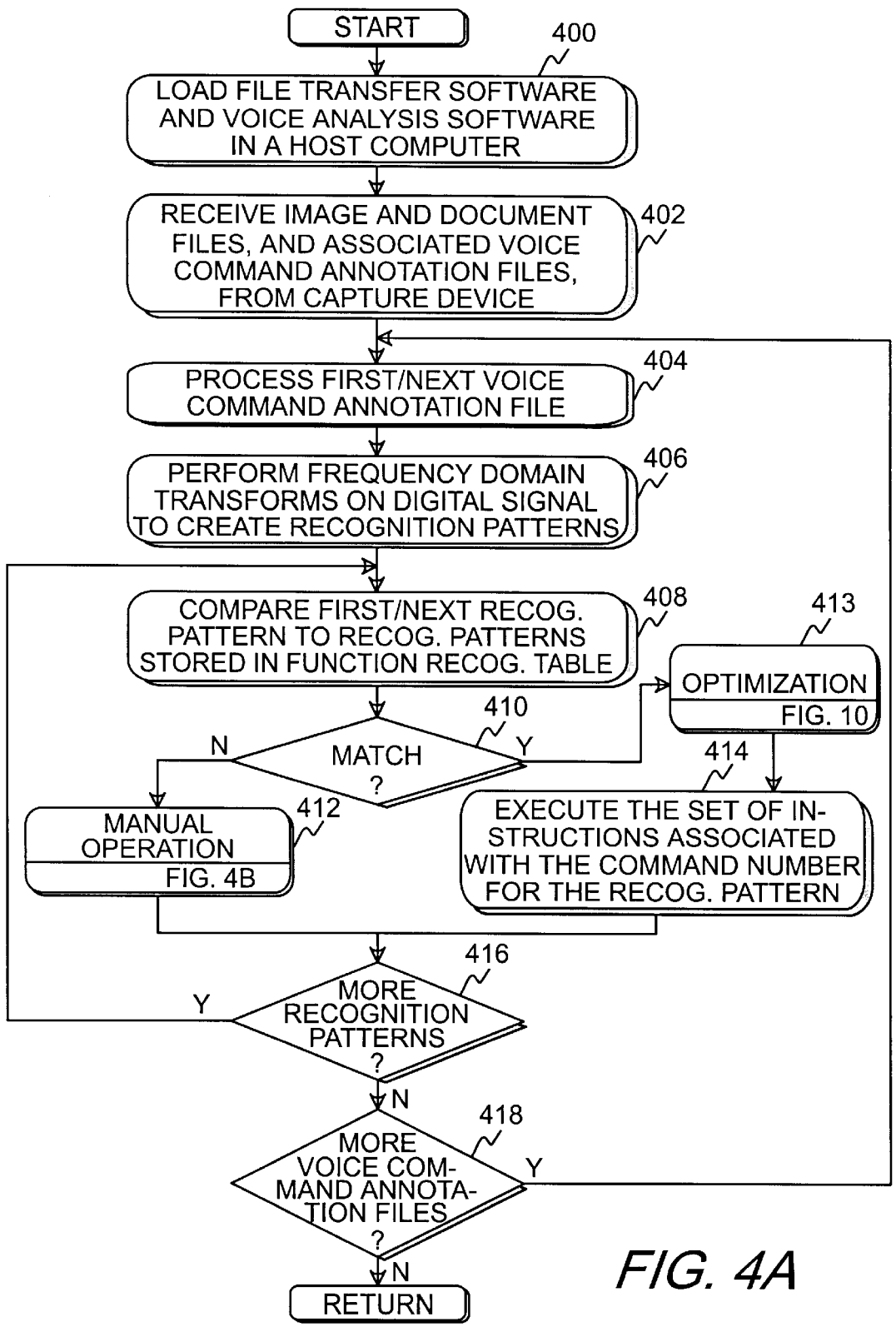
FIGS. 4A and 4B show a flow chart of a host computer that performs speech analysis on the speech disposition commands contained in speech disposition command files or voice annotation files copied from the device of FIG. 3.
Figure 4B:
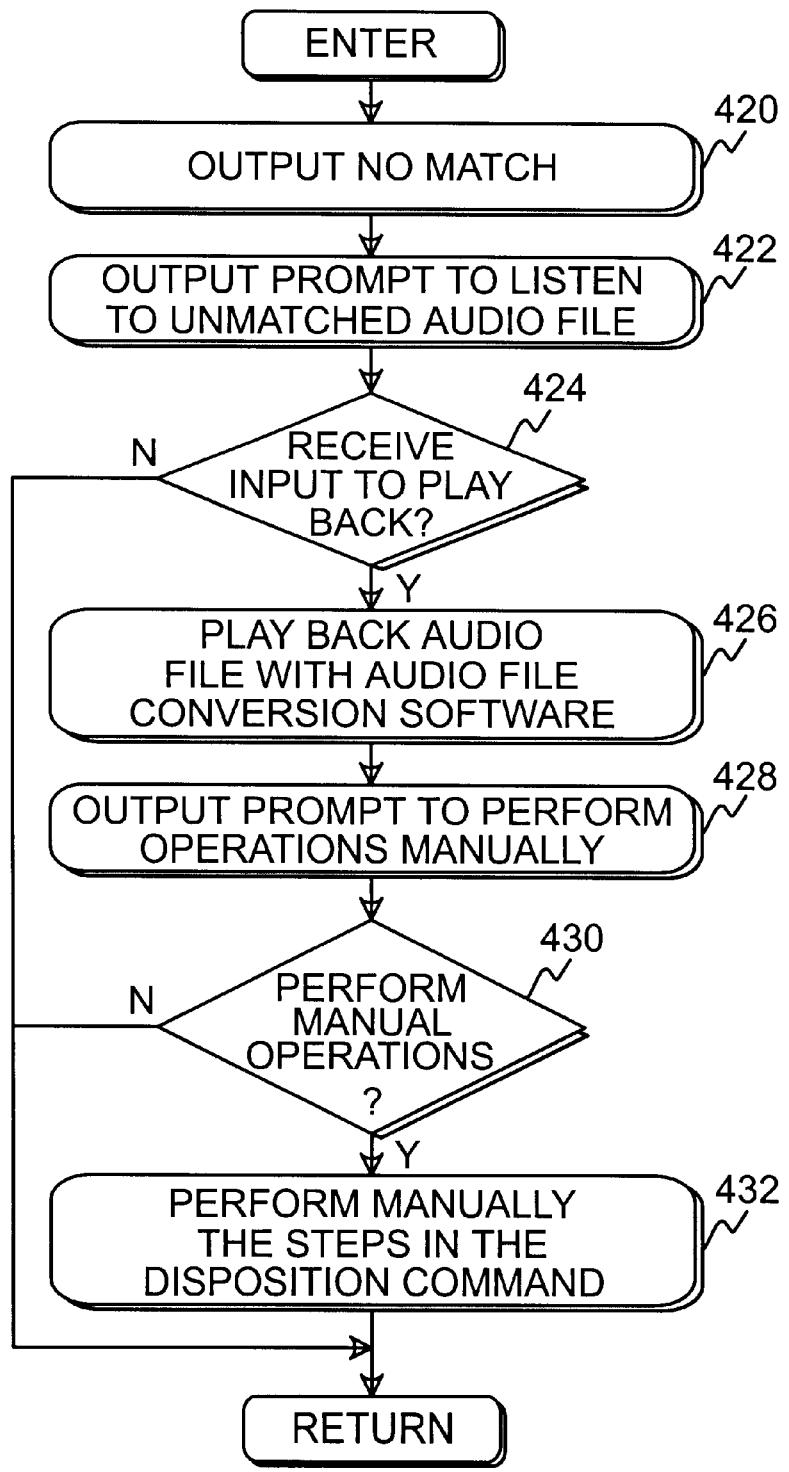

FIGS. 4A and 4B show a flow chart of a host computer that performs speech analysis on the speech disposition commands contained in speech disposition command files or voice annotation files copied from the device of FIG. 3. Referring now to FIG. 4, in step 400 file transfer software 222 and speech and voice analysis software 224 are loaded into memory 218 of host computer system 200 (FIG. 2). In step 402 host computer system 200 receives image data files, document data files, voice annotation files, and speech disposition command files from step 316 in FIG. 3 into memory 218. File transfer software 222 then begins processing the first speech disposition command file received in step 402. In step 406 speech and voice analysis software 224 is called to perform a series of frequency domain transforms on the first digital signal stored in the first speech disposition command file in order to generate a recognition pattern for the digital signal. In step 408, file transfer software 222 compares the recognition pattern generated in step 406 to a number of recognition patterns, representing functions, in function recognition table 230 (FIG. 2) stored in memory 218. Step 410 determines if there is a match between the recognition pattern generated in step 406 and any of the recognition patterns stored in function recognition table 230. Reasons for not finding a match for a valid speech disposition command include the user speaking too fast, too slow, too faint, too far away from the voice pickup component 102, or with an accent such that the resulting recognition pattern falls outside the tolerances built into the speech and voice analysis software. If no match is found in step 410, then step 412 calls FIG. 4B to allow the user the opportunity to perform manually the steps that the user intended to be performed automatically. After returning from FIG. 4B, control then passes to step 416.

Figure 10:
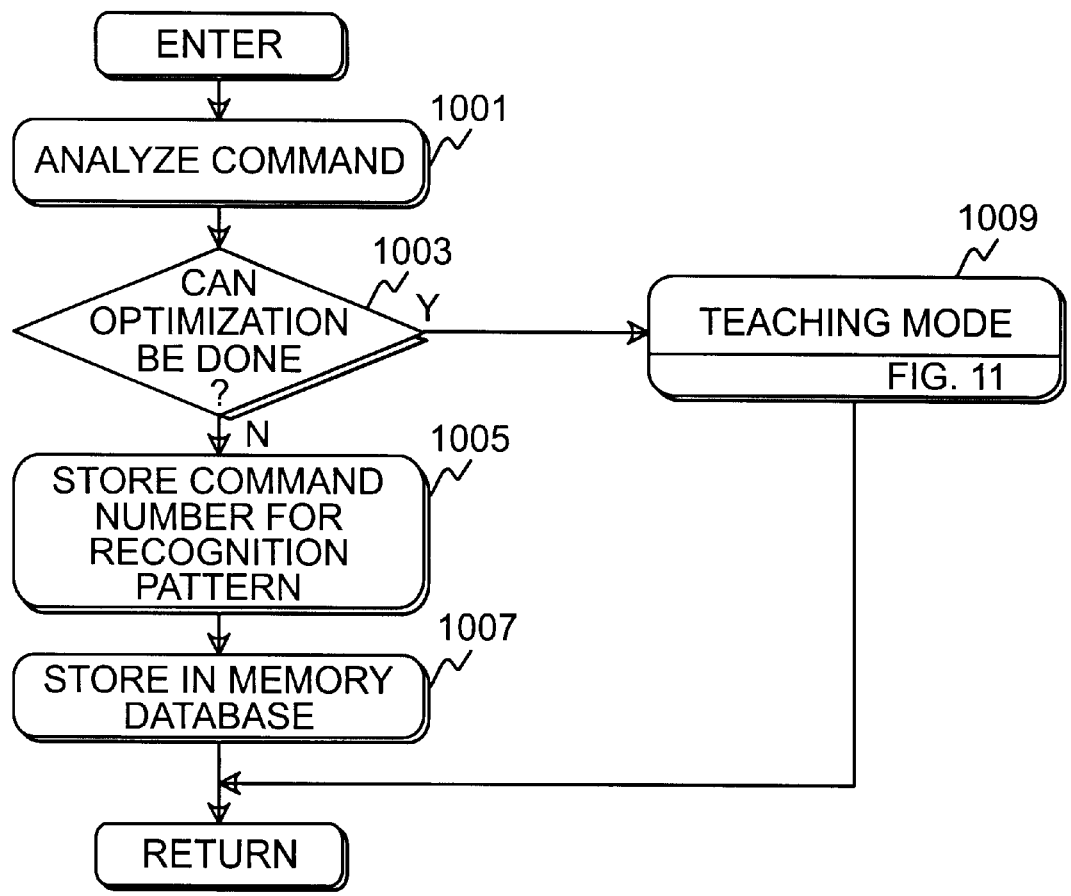
FIG. 10 shows a flow chart illustrating a command analysis component of the present invention.

If in step 410 a match was found, then step 413 calls FIG. 10 to review the recognition pattern generated and determine if the command can be optimized. After returning from FIG. 10, step 413 goes to step 414. In step 414 the command number or command text stored in function recognition table 230 associated with the recognition pattern stored in function recognition table 230 is used to access the instruction or set of instructions for the function represented by the command number or command text. The set of instructions are also stored in function recognition table 230. File transfer software 222 then executes the set of instructions.

Step 416 determines if there are more recognition patterns within the first speech disposition command file that need to be compared. If the answer is yes, control returns to step 408 where the next recognition pattern is compared to the recognition patterns in function recognition table 230. If there are no more recognition patterns to compare in step 416, then step 418 determines if there are more speech disposition command files to be processed. If there are more speech disposition command files to be processed, control returns to step 404. If in step 418 there are no more speech disposition command files to be processed, control returns to operating system 220.

FIG. 4B is called from step 412 in FIG. 4A. In step 420 an indication of no match found is output to the user. The indication could be a text message output to graphics display 210, or an audio message output to speaker/sound card 216 (FIG. 2). In step 422 a prompt is output to the user where the user can select to listen to the audio file where no match was found. Step 424 determines if input is received indicating a desire by the user to play back the audio file. If not, control returns to step 416 of FIG. 4A. If input is received from the user selecting play back, then in step 426 audio file conversion software 228 is called to play back the contents of the speech disposition command file from step 404.

After listening to the speech disposition command stored in the speech disposition command file, in step 428 a prompt is output to the user where the user can select to perform manually the operations that would have been performed automatically if the recognition pattern generated in step 406 had matched any recognition patterns stored in the function recognition table. Step 430 determines if input is received indicating a desire by the user to perform operations manually. If not, control returns to step 416 of FIG. 4A. If input is received form the user selecting to perform operations manually, then in step 432 the user performs the operations desired manually. After the user performs these operations, control returns to step 416 of FIG. 4A.

For example, suppose that upon play back in step 426, the user hears as audio output "fax to Bill Jones". If the user selects to perform manual operations in step 430 in response to the prompt of step 428, then in step 432 the user would manually access the fax utility, enter the fax number for Bill Jones, and fax the image data file or document data file associated with the speech disposition command file.

Figure 5A:
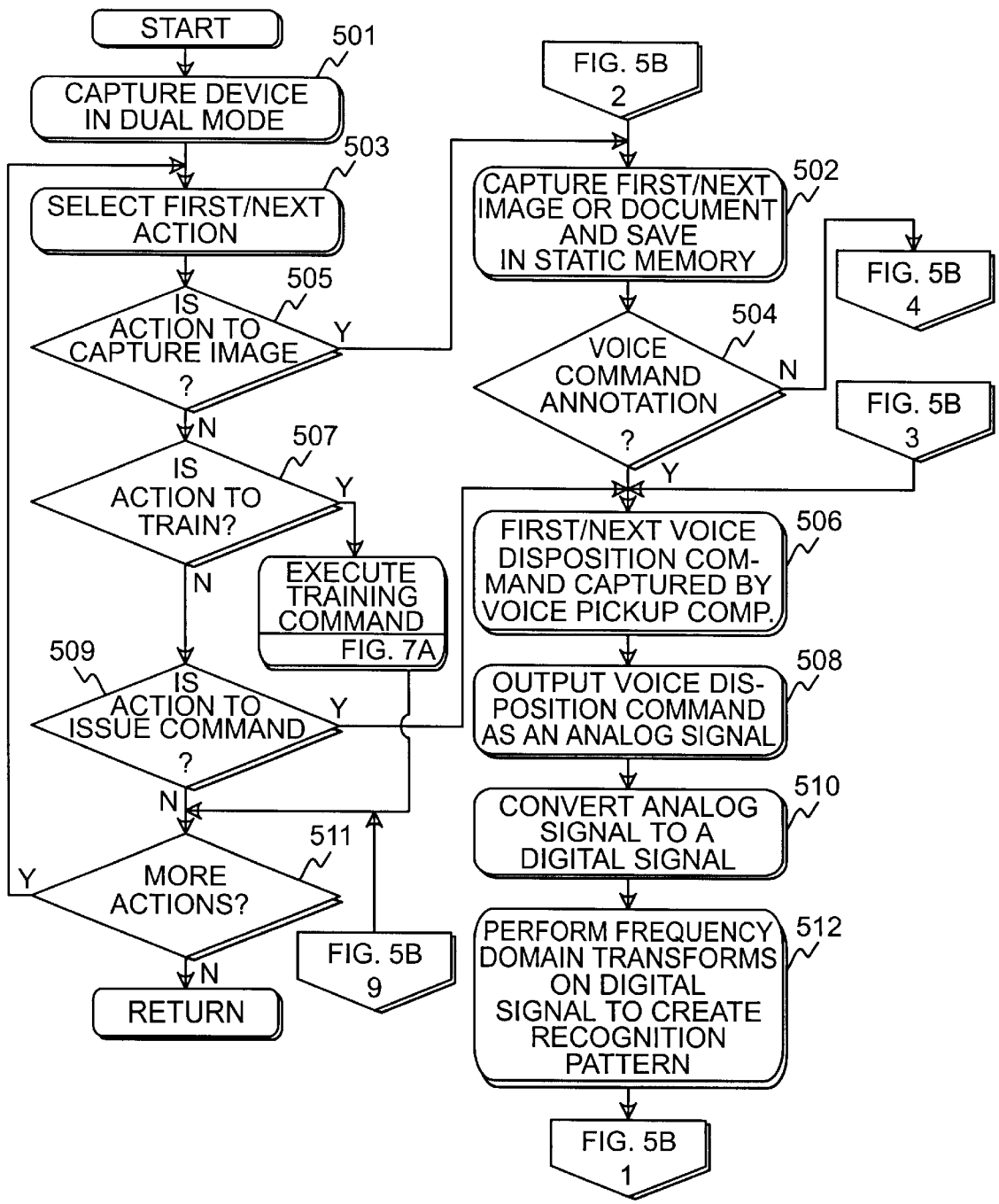
FIGS. 5A and 5B show a flow chart of an embodiment of a device of the present invention that performs speech analysis on speech disposition commands within the device.
Figure 5B:
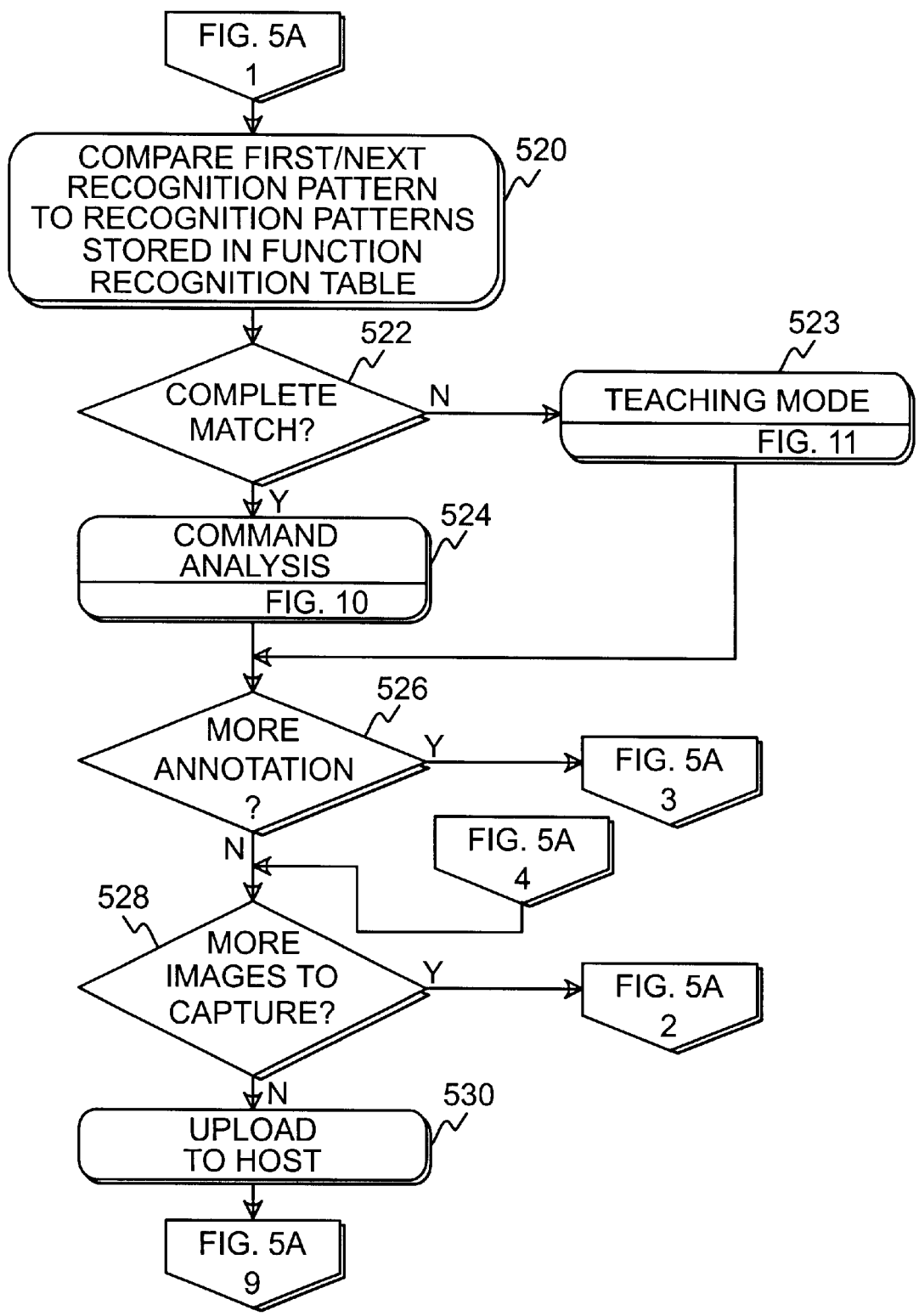

FIGS. 5A and 5B show a flow chart of an embodiment of a device of the present invention that performs speech analysis on speech disposition commands within the device of FIG. 1. Now referring to FIGS. 5A and 5B, the device 100 (FIG. 1) is powered on if it does not have power (not shown in FIG. 5). In step 501, the device enters into its active state of listening and is ready to simultaneously accept commands for execution or for training. Step 503 awaits the user to select the first or next action that it requests the device to perform. Step 505 determines if the user has requested to capture an image or document and save it in static memory of the device. This request could be made by the controller 106 (FIG. 1) receiving a voice control command for making a speech disposition command.

If step 505 determines that the user has requested to capture an image or document, control transfers to step 502, where a first image or document is captured with device 100 and stored in static memory 116 (FIG. 1) as an image data file or a document data file. Step 504 determines if an indication is received in controller 106 (FIG. 1) that a speech disposition command is to be made for the image data file or document data file stored in step 502. Such an indication could be made by controller 106 receiving button down input from one of the control buttons 120 (FIG. 1) or by speech disposition commands.

If an indication for making a speech disposition command is received in step 504, then in step 506 voice pickup component 102 (FIG. 1) captures the first speech disposition command input. In step 508 voice pickup component 102 outputs the speech disposition command input as an analog signal to analog-to-digital converter 104 (FIG. 1). In step 510, analog-to-digital converter 104 converts the analog signal to a digital signal, and outputs the digital signal to controller 106. In step 512 controller 106 calls speech and voice analysis software 124 in static memory 116 (FIG. 1) to perform a series of frequency domain transforms on the first digital signal stored in the first speech disposition command file in order to generate a recognition pattern for the digital signal.

In step 520, the recognition pattern so generated is compared to recognition patterns for functions in function recognition table 126 (FIG. 1) stored in static memory 116. Step 522 determines if there is a complete match between the recognition pattern generated in step 520 and any of the recognition patterns stored in function recognition table 126. If a complete match is found, step 522 transfers to step 524. Step 524 calls FIG. 10 to analyze the recognition pattern of the command. For example, the device may determine the value used by the user is not optimal so a recommendation may be made. After returning from FIG. 10, step 524 goes to step 526.

Step 526 then determines if there is more speech disposition command input for the image data file or document data file stored in step 502. If the answer in step 526 is no, then control passes to step 528.

Step 528 determines if there is an indication that a next image or document is to be captured by device 100. If the answer in step 528 is no, then in step 530, the captured image data files, document data files, voice annotation files, and speech disposition command files are copied from device 100 to host computer system 200, over an established connection which utilizes host connection 122 and communications interface 214. One skilled in the art will recognize that a considerable amount of time may pass between steps 528 and 530, such as when a user is on a trip capturing images or documents, and then travels home, and then begins copying data to host computer system 200. After copying files, control transfers to step 511 to determine if there are more actions to perform.

If the answer is yes in step 528, then control returns to step 502 where the next image or document is captured by device 100 and stored in static memory 116. If in step 526 the answer is yes, control returns to step 506 where the next speech disposition command input is captured by voice pickup component 102.

If no match is found in step 522, then control passes to step 523. Step 523 calls FIG. 11 to enter into teaching mode. After returning from FIG. 11, step 523 goes to step 526.

If such an indication is not received in step 504, then control passes to step 528 on FIG. 5B.

If in step 505, the action is not to capture, control goes to step 507 where the device determines if the user requests to train the device with a new command. If in step 507 the user requests to train the device, then step 513 calls FIG. 7A to enter training mode. After returning from FIG. 7A, step 513 goes to step 511 to determine if more actions are requested by the user. If in step 507 the user does not request to train the device, then control passes to step 509.

Step 509 determines if the user has requested to issue a speech disposition command such as a "memorize" speech disposition command or similar command for building up the memory database 117 (FIG. 1). If the user issues a command, step 509 transfers to step 506 for voice pickup component 102 (FIG. 1) to capture the first speech disposition command input. If not, then step 509 transfers to step 511. Step 511 determines if there are more actions to perform. If there are more actions, step 511 transfers back to step 503. If there are no more functions to perform, step 511 exits.

Figure 6:
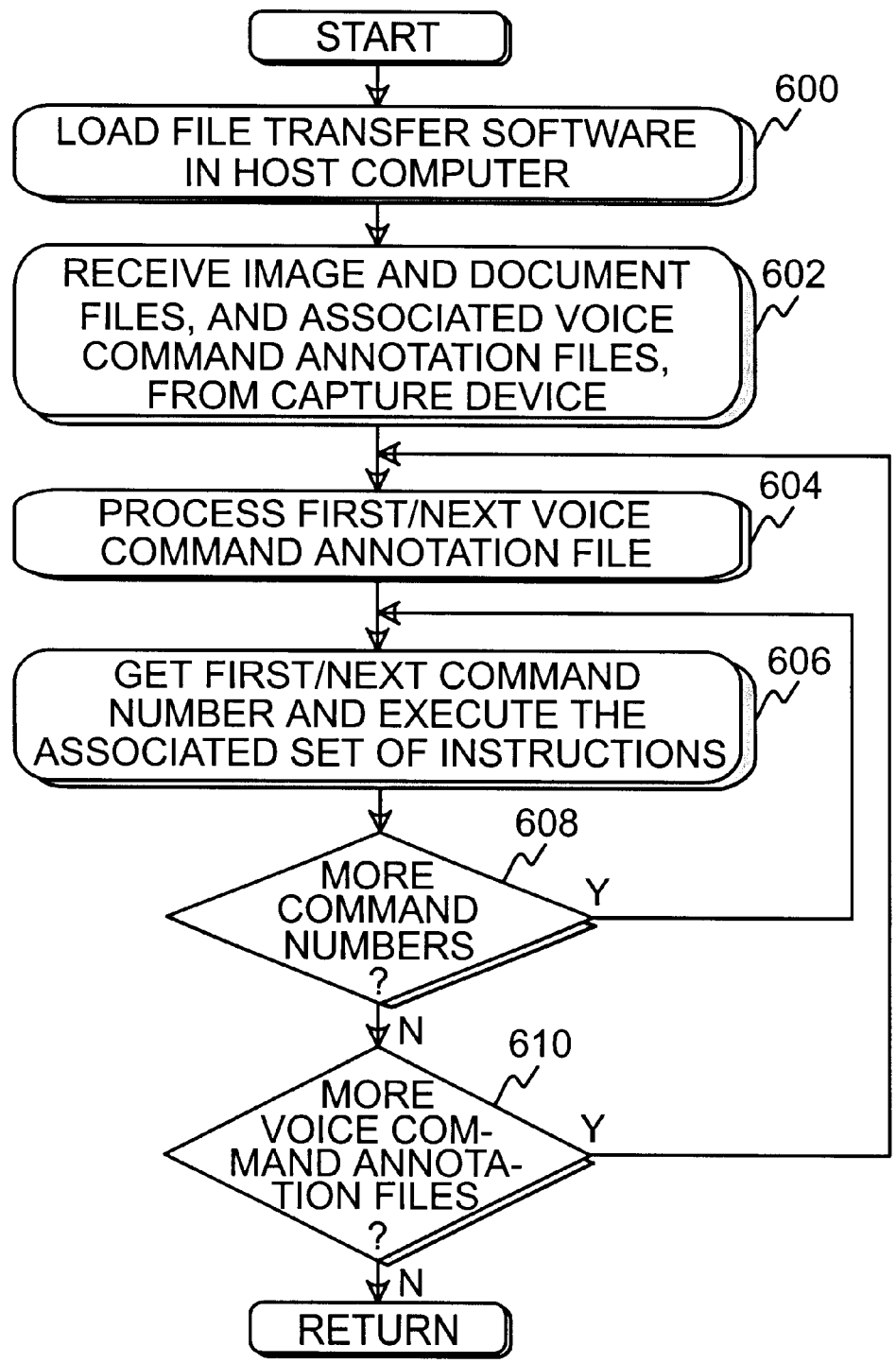
FIG. 6 shows a flow chart of a host computer that receives speech disposition command files or voice annotation files where speech analysis has already been performed by the device of FIGS. 5A and 5B.

FIG. 6 shows a flow chart of a host computer that receives speech disposition command files or voice annotation files where speech analysis has already been performed by the device of FIGS. 5A and 5B. Referring now to FIG. 6, in step 600 file transfer software 222 is loaded into memory 218 of host computer system 200 (FIG. 2). In step 602 host computer system 200 receives image data files, document data files, voice annotation files, and speech disposition command files from step 528 in FIG. 5 into memory 218. In step 604, file transfer software 222 then begins processing the first speech disposition command file received in step 602. In step 606 the first command number or command text in the first speech disposition command file is used to access the instruction or set of instructions associated with the command number or command text that is stored in function recognition table 230 (FIG. 2).

After the one or more instructions have been executed in step 606, step 608 determines if there are more command numbers or command text in the first speech disposition command file from step 604. If there are more command numbers or command text, then control returns to step 606 to access and execute the next set of instructions associated with the next command number or command text. If in step 608 there are no more command numbers or command text, then step 610 determines if there are more speech disposition command files to be processed. If the answer is yes, then control returns to step 604 where the next speech disposition command file is processed. If the answer in step 610 is no, then control returns to operating system 220.

Figure 7A:
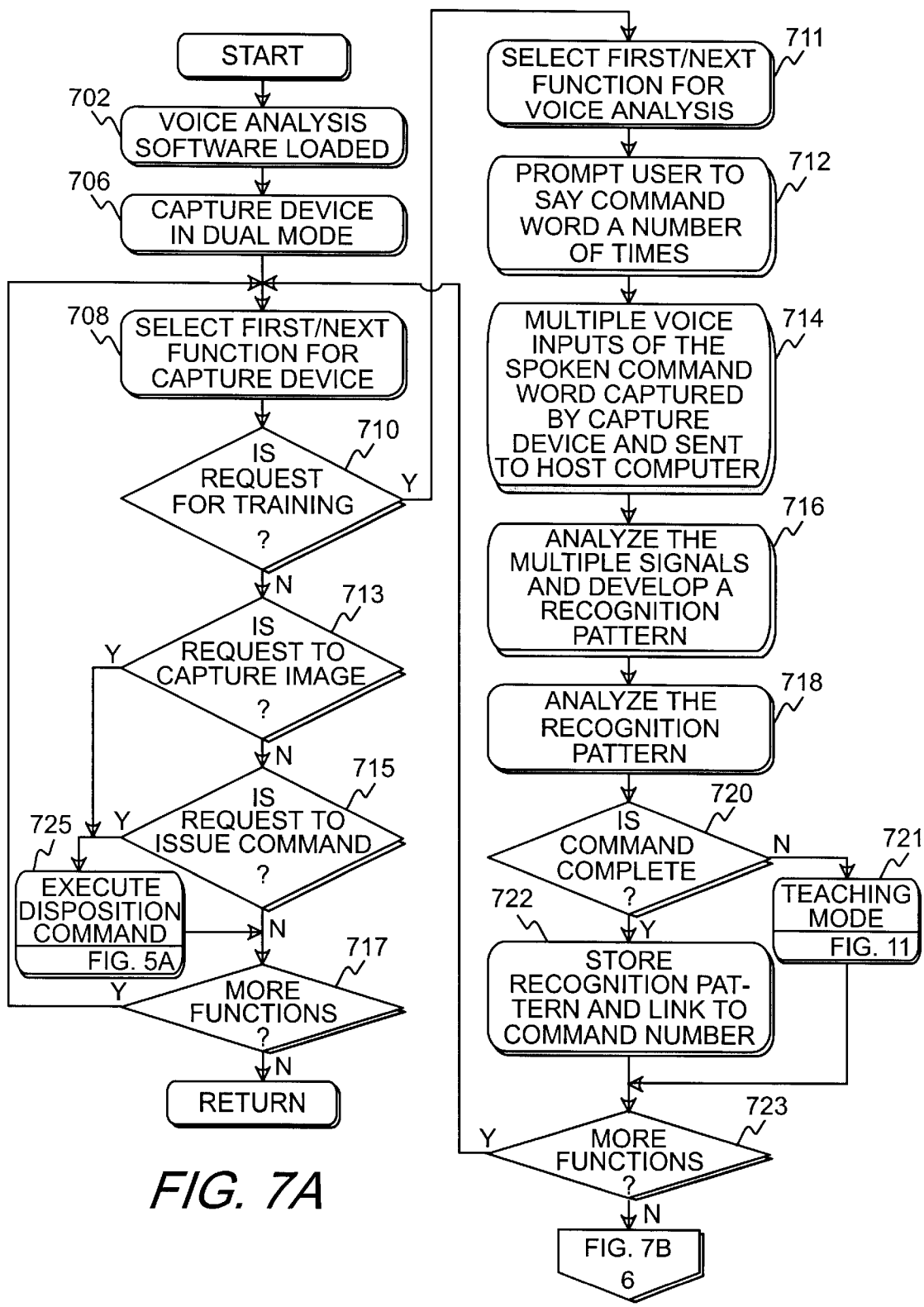
FIGS. 7A and 7B show a flow chart of training a device of the present invention to recognize a user's voice when creating speech disposition commands.
Figure 7B:
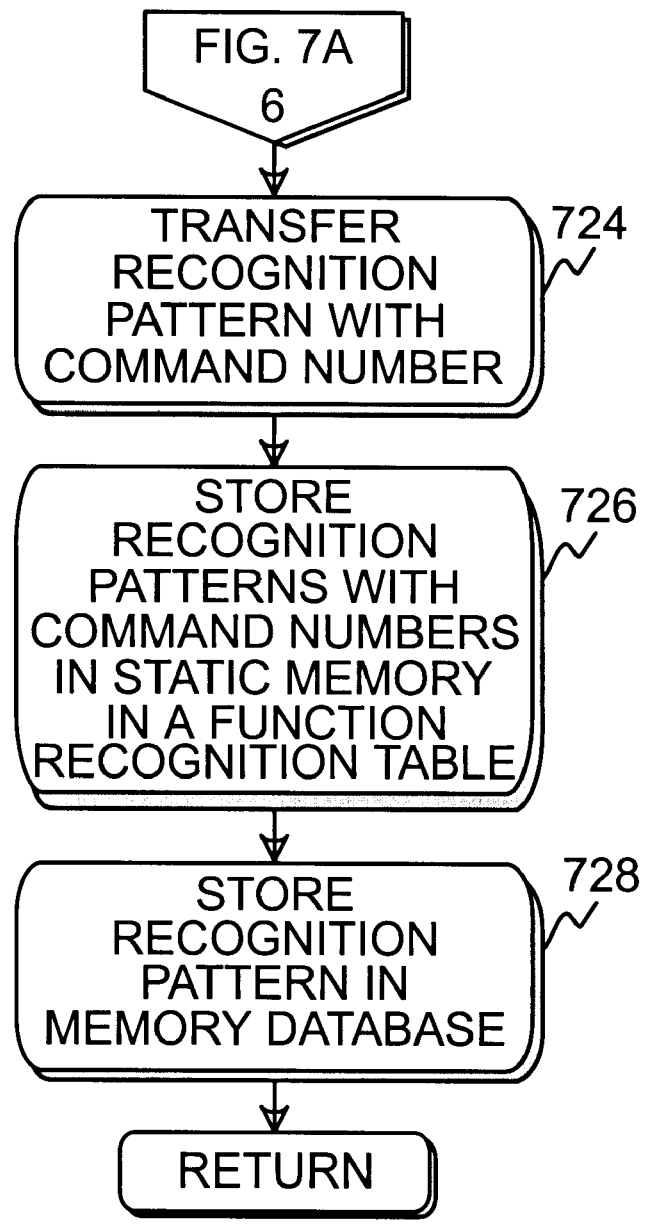

FIGS. 7A and 7B show a flow chart of training a device of the present invention to recognize a user's voice when creating speech disposition commands. Referring now to FIGS. 7A and 7B, the device 100 (FIG. 1) is powered on if it does not have power (not shown in FIG. 7A). In step 702 speech and voice analysis software 124 is loaded into memory 118 (FIG. 1). In step 706, the device enters its dual mode operation where the device is capable of being trained and executing speech disposition commands in a multiprocessing fashion. In step 708, input from a user is received to select an operation for the device. The user can select to enter into training or execution mode. If in execution mode input is received in the form of a speech disposition command or voice annotation for execution.

Step 710 determines if the user requests to enter into training mode. If not, control passes to step 713. Step 713 determines if the user requests to issue a command to capture an image. If in step 713, the user does not request to capture an image, control transfers to step 715.

Step 715 determines if the user requests to issue a speech disposition command. If not, step 715 transfers to step 717 to determine if there are more functions to perform. If there are no more functions to perform, step 717 returns to the calling function. If there are more functions to perform, step 717 goes back to step 708 to select the next function for the capture device.

If in step 715 the user requests to issue a speech disposition command, control passes to step 725. Step 725 calls FIG. 5A to issue a speech disposition command. After returning from FIG. 5A, step 725 goes to step 717. If in step 713 the request is to capture an image, control passes to step 725. Step 725 calls FIG. 5A to allow the user to capture an image. After returning from FIG. 5A, step 725 goes to step 715.

If the user requests training mode in step 710, control passes to step 711 where input from a user is received in speech and voice analysis software 124 selecting a first function by its command number or command text for training and voice analysis. Speech and voice analysis software 124 then prompts the user in step 712 to audibly repeat the command word the user has chosen to invoke the first function into voice pickup component 102 (FIG. 1) of device 100 a multiple number of times. In step 714, the multiple voice inputs captured by voice pickup component 102 are processed by device 100 into digital signals and sent to speech and voice analysis software 124. The speech and voice analysis software 124 in step 716 analyzes the multiple digital signals received in step 714 and develops a recognition pattern for the command word. In step 718, the recognition pattern of step 716 is analyzed to see if the recognition pattern is executable e.g. the user has provided all the parameters for the function. Step 720 determines if the command is complete and corresponds to an executable command. If not, control transfers to step 721. Step 721 calls FIG. 11 to further examine the speech disposition command and make any necessary modifications to the speech disposition command. After returning from FIG. 11, control passes to step 723. If the recognition pattern is complete in step 720, the recognition pattern of step 716 is stored in memory 118 in step 722.

After step 722, step 723 determines if the user has selected a next function for training and voice analysis. If a next function has been selected in step 723, control returns to step 708. If an indication is received that the user is done selecting functions, then step 723 goes to step 724. In step 724 speech and voice analysis software 124 stores in memory 118 all recognition patterns determined in step 716 and stored in step 722, and the command number or command text associated with each function. In step 726 the recognition patterns and their associated command numbers or command text transferred in step 724 are stored in static memory 116 in a function recognition table 126 (FIG. 1). The recognition pattern and command number or command text for each function are linked to the set of instructions that will be executed upon receiving the voice control command input that, when processed into a recognition pattern, matches one of the recognition patterns determined in step 718. After step 728 training and voice analysis of device 100 ends.

Even in training mode, the present invention is able to teach the user when a command is incorrect. For example, if the user was training the device to recognize a new command to scan a document and did not include the resolution in dots per inch (dpi) the device could use the default of 150 dpi if a value was omitted and the device was in default mode. This default option could be a setting that the device recognizes and is set up by the user to revert to default settings if a value has a default option and is missing for a subcommand or command. Or, the device could notify the user that a resolution has not been provided and prompt it to use the default value of 150 dpi.

Figure 8:
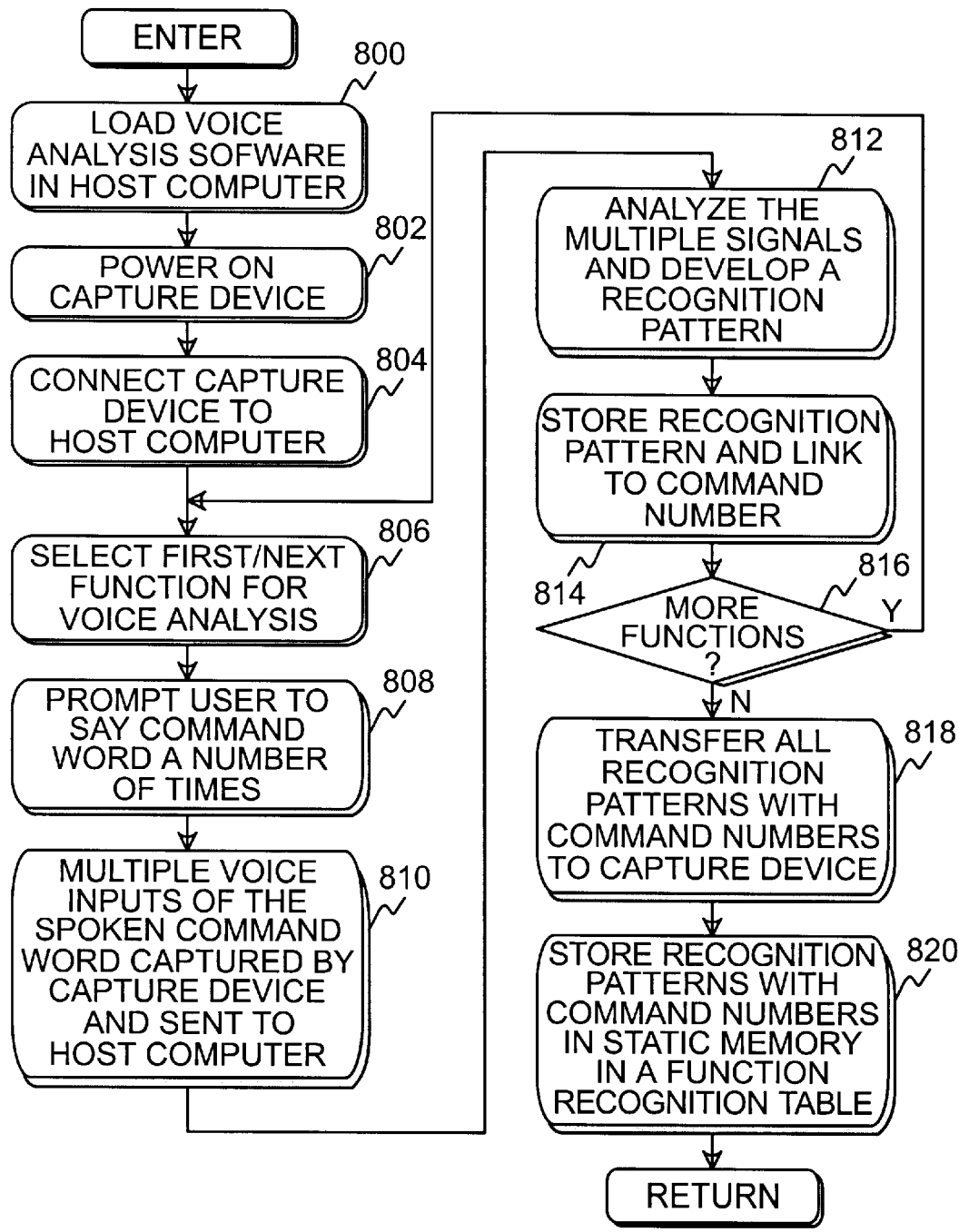
FIG. 8 shows a flow chart of rudimentary training of the present invention to recognize a user's voice when creating speech disposition commands where the device is tethered to a host computer.

FIG. 8 shows a flow chart of rudimentary training of the present invention to recognize a user's voice when creating speech disposition commands where the device is tethered to a host computer. Referring now to FIG. 8, in step 800 speech and voice analysis software 224 is loaded into memory 218 in host computer system 200 (FIG. 2). Device 100 (FIG. 1) is powered on in step 802. In step 804 device 100 is connected to host computer system 200. This could be through a wire cable, an infra-red beam, or any other suitable connection. In step 806, input from a user is received in speech and voice analysis software 224 selecting a first function by its command number or command text for training and voice analysis. Speech and voice analysis software 224 then prompts the user in step 808 to audibly repeat the command word the user has chosen to invoke the first function into voice pickup component 102 (FIG. 1) of device 100 a multiple number of times. In step 810, the multiple voice inputs captured by voice pickup component 102 are processed by device 100 into digital signals and sent to speech and voice analysis software 224 in host computer system 200. The speech and voice analysis software 224 in step 812 analyzes the multiple digital signals received in step 810 and develops a recognition pattern for the command word. The recognition pattern of step 812 is stored in memory 218 in step 814.

Step 816 determines if the user has selected a next function for training and voice analysis, or if an indication is received that the user is done selecting functions for training and voice analysis. If a next function has been selected in step 816, control returns to step 806. If an indication is received that the user is done selecting functions, then in step 818 speech and voice analysis software 224 transfers all recognition patterns determined in step 812 and stored in step 814, and the command number or command text associated with each function, to device 100 over the connection established in step 804. In step 820 the recognition patterns and their associated command numbers or command text transferred in step 818 are stored in static memory 116 in a function recognition table 126 (FIG. 1). The recognition pattern and command number or command text for each function are linked to the set of instructions that will be executed upon receiving the voice control command input that, when processed into a recognition pattern, matches one of the recognition patterns determined in step 812. After step 820 training and voice analysis of device 100 ends.

Figure 9:
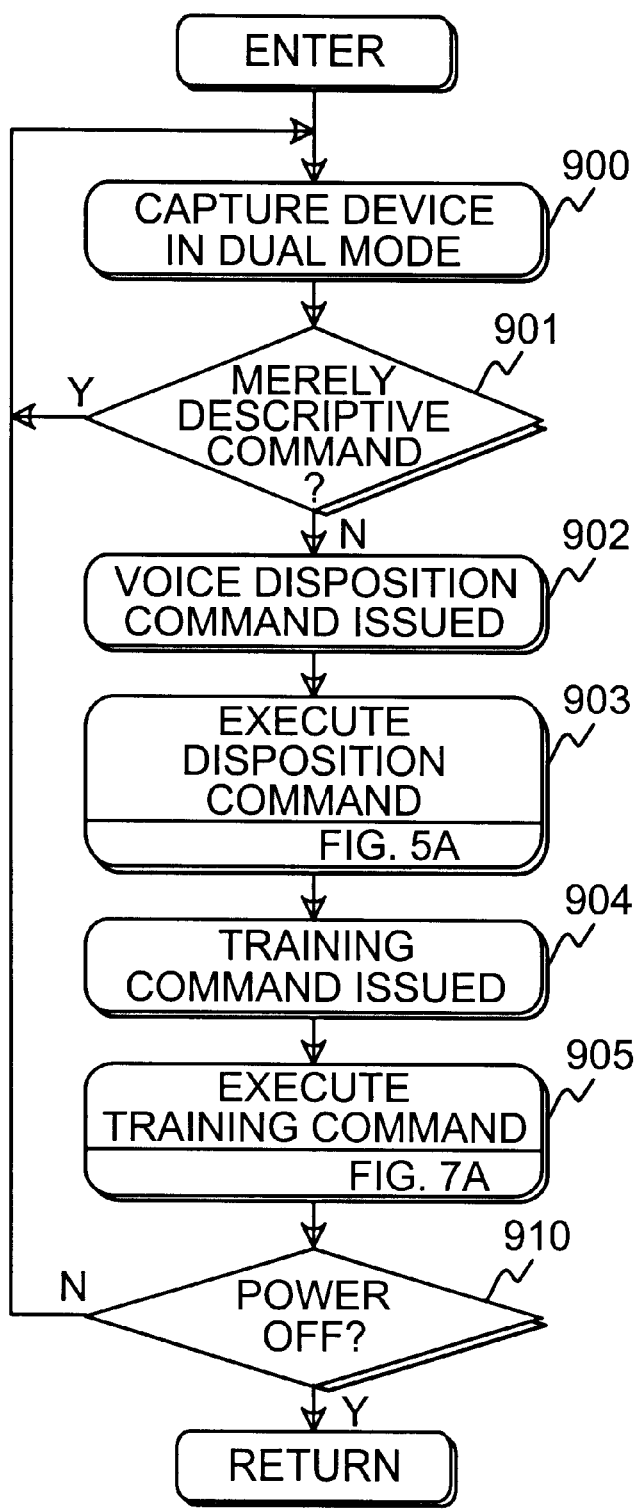
FIG. 9 shows a flow chart illustrating a multiprocessing component of the present invention.

FIG. 9 shows a flow chart illustrating a multiprocessing component of the present invention. The device is capable of simultaneously processing two speech disposition commands if a first speech disposition command is for executing and a second speech disposition is for executing or training. Now referring to FIG. 9, in step 900 the voice pickup component 102 (FIG. 1) of device 100 is in its dual train and execute mode waiting to receive input and take the requested action. Step 901 determines if the input received is merely descriptive, which means no actual speech disposition command was intended. This is accomplished by controller 106 parsing the input received by user and spoken into the voice pickup component 102 and determining the voice input is just a description. This can be determined when the user stops speaking for more than a predetermined period of time, such as between two to five seconds and additional information necessary to comprise a speech disposition command is not received, so that the device interprets such predetermined period of absence of voice input as marking the end of the stream of voice input. Or it can be determined a description, if part of a speech disposition command is spoken into the voice pickup component 102, with several other unmeaningful words. Here, the controller 106 of device 100 would determine that the user does not intend to issue a speech disposition, voice control, or voice annotation command. If so, control returns back to step 900.

If the input is not descriptive, then control passes to step 902. In step 902, the user selects at least one speech disposition command for execution. Step 902 is shown immediately after step 901 but it could occur anywhere after step 901 in FIG. 9. In step 902, the device is capable of handling simultaneous speech disposition commands for execution. After step 902, step 903 calls FIG. 5A to execute the at least one speech disposition or voice control command requested in step 902. After return from FIG. 5A, control passes to step 904.

For example, the user may have selected a first speech disposition command, "print", to print an image but inadvertently does not include a destination. Immediately after the user issues the first speech disposition command, still in step 902, the user issues a second speech disposition command for execution such as "memorize email address for Frank Bisco bisco@scanner.com". FIG. 5A determines if the first speech disposition command issued in step 902 is correct. If the speech disposition command is correct, then FIG. 5A executes the first speech disposition command after performing speech analysis and optimization analysis (FIG. 10) on the first speech disposition command. If the command is not correct, FIG. 5A calls FIG. 11 to modify the command by entering its teaching mode for possible later execution. A similar process is completed to execute the second speech disposition command.

Step 904 is shown after step 902 for demonstrative purposes, however, like step 902, step 904 could occur anywhere after step 901 in FIG. 9. In step 904 the user requests a voice control command for training. The device is capable of simultaneously processing both at least one speech disposition command for execution and a second speech command for training. After step 904, control passes to step 905. Step 905 calls FIG. 7A for training the device to recognize a user's voice command inputs. Similarly, as in step 902, FIG. 7A may call FIGS. 11 and 10 if necessary. After return from FIG. 7A, control passes to step 910. Step 910 determines if a power off voice control command has been issued. If so, the device is powered off. If not, control passes back to step 900.

For example if the speech disposition command is missing a print destination, the device would try to find a value for the destination. A new value for the destination could be found in several ways. First, the device may prompt the user to use a default value, such as the unit itself. If the device is in default mode the device will not prompt the user but rather assign the default value and proceed. Second, the device will access the memory database 117 (FIG. 1) to check if the user has used a similar speech disposition command in the past. The user will be prompted to accept a print destination from the memory database 117. Next, the user will be prompted to enter a new print destination. Fourth, the user will be prompted to repeat or cancel the speech disposition command.

FIG. 10 shows a flow chart illustrating a command analysis component of the present invention. This command analysis may be done on either the host computer or the capture device. Referring now to FIG. 10, in step 1001 the speech disposition or voice control command issued by the user is analyzed. The speech disposition or voice control command may be compared to similar recognition patterns stored in the memory database 117 (FIG. 1), memory database 217 (FIG. 2), function recognition table 126 (FIG. 1), or function recognition table 230 (FIG. 2). This analysis can be done by any other method understood by those skilled in the art in the area of speech recognition.

Step 1003 determines if optimization of the speech disposition or voice control command can be done by the device or host. If optimizations can be done, control transfers to step 1009. Step 1009 calls FIG. 11. If an optimization cannot be provided, step 1003 transfers to step 1005. In step 1005 the command number or command text stored in function recognition table 126 that is associated with the recognition pattern is stored in a speech disposition command file. The speech disposition command file is associated with the image data file or document data file. Step 1007 stores the recognition pattern as a comparable format in the appropriate memory database such as memory database 117 (FIG. 1) for future use.

Figure 11:
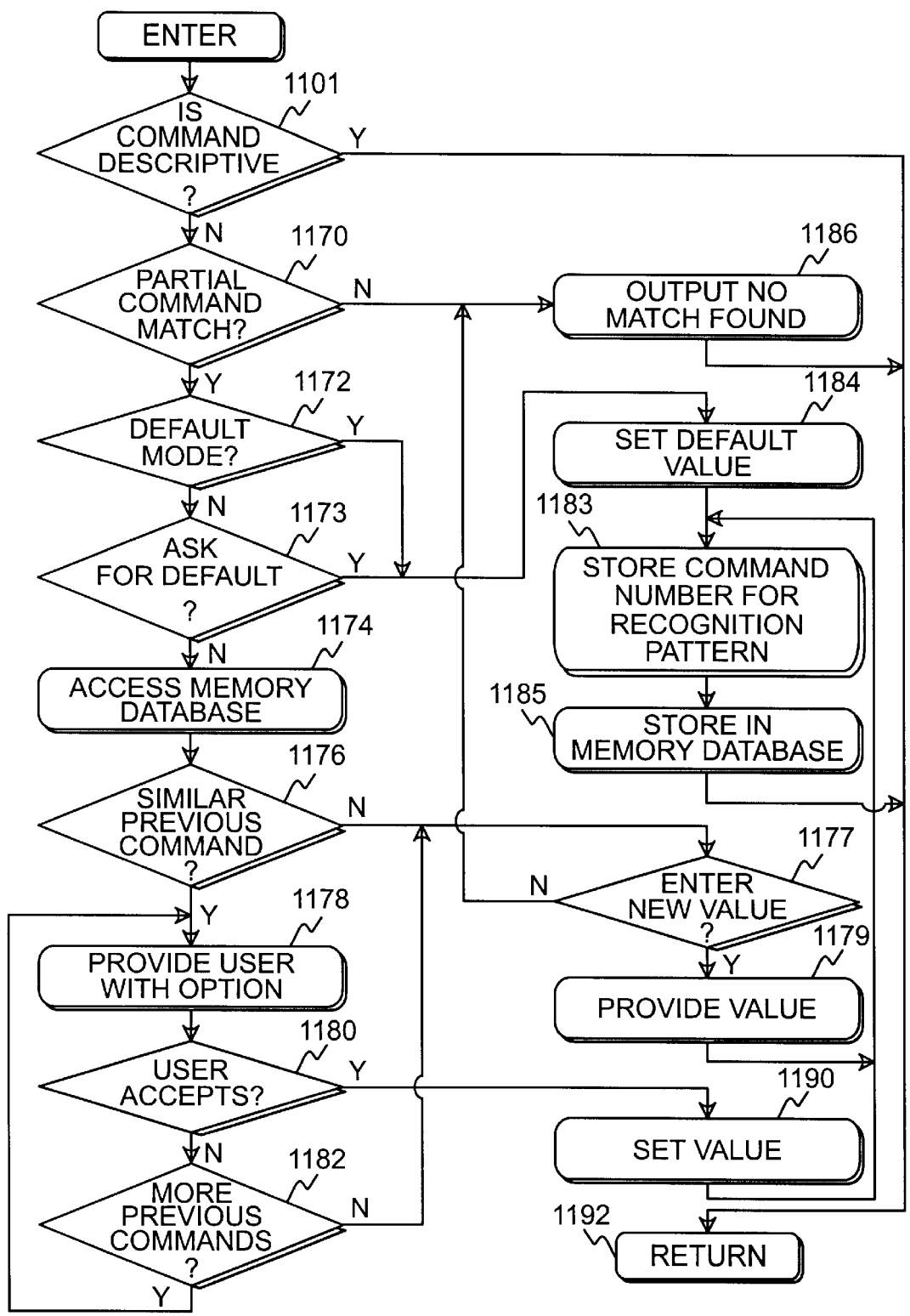
FIG. 11 shows a flowchart of the teaching mode of the present invention to correct or modify an incorrect speech disposition command.

FIG. 11 shows a flowchart of the teaching mode of the present invention to correct or modify an incorrect speech disposition command. Referring now to FIG. 11, step 1101 determines if the speech disposition command issued is a descriptive statement. If so, control returns back to the calling function. If not, then control goes to step 1170.

Step 1170 determines whether there is a partial command match. Step 1170 determines if there is a partial command match between the recognition pattern generated and any of the recognition patterns stored in function recognition table 126. This command match may be a partial match because of the teaching mode. If no match is found in step 1170, then in step 1186 an indication of no match found is output to the user. The indication could be a text message output to display 114, or an audio message output to speaker 110 (FIG. 1). After step 1186, control returns to the calling function.

If in step 1170 it is determined there is a partial match, step 1170 goes to step 1172. Step 1172 determines if the user has the device in default mode. If the device is not in default mode step 1172 goes to step 1173. Step 1173 determines if the user wants to use the default value. The device outputs a message that prompts the user to use the default value. The output message will prompt the user to accept or deny the default value. The user can supply a yes or no voice response which will be picked up and parsed by the voice pickup component.

If the user does not accept the default value, control goes to step 1174. Step 1174 accesses the memory database that stores the previously issued speech disposition commands. The memory database 117 (FIG. 1) stores all the commands that have been issued by the user. After the memory database is accessed, step 1176 determines if a similar command has been previously issued by the user.

If a similar command is found in the memory database then control goes to step 1178. Step 1178 outputs a message that provides the user with an option to use the previous value. In step 1180, a determination is made by the user to accept the value returned from the memory database.

If the user does not accept the value returned from the memory database 117 (FIG. 1), step 1182 determines if there are more previous commands that were returned from step 1174. If so, the control passes back to step 1178. If in step 1182 there are no more previous commands, control passes to step 1177 to give the user an opportunity to enter a new value. Step 1177 determines if the user enters a new value for the speech disposition command. If so, in step 1179 the device accepts the new value entered by the user. Then, in step 1183 the command number or command text stored in function recognition table 126 that is associated with the recognition pattern stored in function recognition table 126 is stored in a speech disposition command file. The speech disposition command file is associated with the image data file or document data file. Step 1185 stores the recognition pattern as a comparable format in the memory database for future use. Then control returns to the calling function.

If in step 1177 the user chooses not to enter a new value, control passes to step 1186 to output a message that no match was found. After step 1186, control transfers to the calling function.

If the user accepts the value returned in step 1180, control goes to step 1190. In step 1190 the speech disposition command is updated with the previous value. Then, in step 1183 the command number or command text stored in function recognition table 126 that is associated with the recognition pattern stored in function recognition table 126 is stored in a speech disposition command file. The speech disposition command file is associated with the image data file or document data file. Step 1185 stores the recognition pattern as a comparable format in the memory database for future use.

If a similar command has not been issued, then step 1176 passes control to step 1177. Step 1177 determines if the user enters a new value for the speech disposition command. If so, in step 1179 the device accepts the new value entered by the user. If the user chooses not to enter a new value, control passes to step 1186 to output a message. Step 1186 outputs a no found output to the user. After step 1186, control exits to the calling function.

If the user accepts the default value in step 1173 the command is updated with the default value in step 1184. After step 1184, in step 1183 the command number or command text stored in function recognition table 126 (FIG. 1) that is associated with the recognition pattern stored in function recognition table 126 is stored in a speech disposition command file. The speech disposition command file is associated with the image data file or document data file. Next, step 1185 stores the recognition pattern as a comparable format in the memory database for future use. After step 1185, control returns to the calling function.

If in step 1172 the device is in default mode, control goes to step 1184. In step 1184, the default value will be used without prompting the user. Then, control transfers to step 1183.

For example, if the user requested to scan a document and did not include the resolution in dots per inch (dpi) the device could use the default of 150 dpi if a value was omitted. This default option could be a setting that the device recognizes and is set up by he user to revert to default settings if a value has a default option and is missing for a subcommand or command. Or, the device could notify the user that a resolution has not been provided and prompt it to use the default value of 150 dpi.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A speech command interface method for a device, said method comprising the steps of:
    (a) capturing at least one speech disposition command with a voice pickup component in said device;
    (b) processing, within one task of a multitasking controller, said at least one speech disposition command to correct any errors within said at least one speech disposition command;
    (c) storing said at least one speech disposition command processed with said multitasking controller in a speech disposition command file;
    (d) associating said speech disposition command file with a data file in said device;
    (e) processing said speech disposition command file to identify at least one function associated with said at least one speech disposition command;
    (f) executing at least one instruction associated with said at least one function, wherein said at least one instruction acts upon said data file;
    (g) storing said at least one speech disposition command in a previous command database; and
    (h) repeating steps (a) through (g) indefinitely.

2. The speech command interface method for a device according to claim 1 wherein step (b) further comprises the steps (b1) through (b3):
    (b1) converting said speech disposition command to a first recognition pattern and comparing said first recognition pattern to at least one recognition pattern stored in a function recognition table;
    (b2) when said first recognition pattern does not match said at least one recognition pattern stored in said function recognition table, outputting a first message indicating that no match was found and prompting for user input to correct the speech disposition command;
    (b3) when said user input from step (b2) indicates a request to perform manual operations, suspending said speech command interface method until said manual operations are performed.

3. The speech command interface method for a device according to claim 1 wherein step (b) further comprises the steps (b1) through (b5):
    (b1) converting said speech disposition command to a first recognition pattern and comparing said first recognition pattern to at least one recognition pattern stored in a function recognition table;
    (b2) when said first recognition pattern does not match said at least one recognition pattern for said at least one function stored in said function recognition table, outputting a first message in said device indicating that a modification is necessary;
    (b3) accessing said previous command database to find a match of a previous command for said first recognition pattern and identifying at least one modification to said command from said previous command;
    (b4) prompting for user input to make said at least one modification; and
    (b5) outputting a second message in said device prompting for user input to apply said at least one modification and continue or to cancel if said modification is not made.

4. The speech command interface method for a device according to claim 1 wherein step (b) further comprises the steps (b1), through (b4):
    (b1) converting said speech disposition command to a first recognition pattern and comparing said first recognition pattern to at least one recognition pattern stored in a function recognition table;
    (b2) when said first recognition pattern does not match said at least one recognition pattern for said at least one function stored in said function recognition table, determining if a default mode is selected;
    (b3) when step (b2) determines that said default mode is not selected, outputting a first message indicating that said speech disposition command is incorrect and asking to modify said speech disposition command with default values;
    (b4) prompting for user input to use said default values; and
    (b5) outputting a second message in said device prompting for user input to apply said default values or to cancel if said modification is not made.

5. The speech command interface method for a device according to claim 1 wherein step (a) further comprises the steps (a0) through (a6) performed before step (a):
    (a0) loading voice analysis software into said a memory of said device;
    (a1) selecting a predetermined function, with said voice analysis software, for training and voice analysis of at least one word for invoking a predetermined function;
    (a2) capturing a plurality of voice inputs of said at least one word in said voice pickup component of said device;

(a3) processing said plurality of voice inputs into a plurality of digital signals;

(a4) analyzing said plurality of digital signals with said voice analysis software;

(a5) developing [said] at least one recognition pattern from said analysis of said plurality of digital signals with said voice analysis software;

(a6) storing said at least one recognition pattern in said function recognition table in said memory.

6. The speech command interface method for a device according to claim 1 further comprising the step of:

(i) printing a log of said at least one speech disposition command that indicates whether said at least one instruction associated with said at least one function succeeded or failed.

7. The speech command interface method for a device according to claim 1 further comprising the step of:

(i) determining whether said at least one speech disposition command is optimal by analyzing said speech disposition command before processing said speech disposition command.

8. A device with voice command interface comprising:

a voice pickup component for capturing at least one speech disposition command, and for outputting said at least one speech dispositon command as a digital signal;

a multitasking controller, connected to an analog-to-digital converter, for receiving said digital signal from said analog-to-digital converter;

a memory, connected to said multitasking controller, wherein said multitasking controller stores said digital signal in said memory in a speech disposition command file and associates said speech disposition command file to a data file stored in said memory, and further wherein said multitasking controller repeatedly determines whether a second speech disposition command is simultaneously being performed with said at least one speech disposition command, and wherein said multitasking controller processes said speech disposition command to identify at least one function associated with said at least one speech disposition command, and further wherein said multitasking controller processes said second speech disposition command to identify a second function associated with said second speech disposition command, wherein said multitasking controller executes said first and second functions concurrently; and a correcting unit for modifying said at least one function associated with said at least one speech disposition command and said at least one function associated with said second speech disposition command.

9. The device according to claim 8 further comprising:

a database for storing said at least one recognition pattern and associated said command number and said second recognition pattern;

wherein said correcting unit accesses said database and compares said first recognition pattern to said at least one recognition pattern stored in said database and suggests modifications for functions that contain an error.

10. The device according to claim 8 further comprising:

an area of said memory for storing at least one default value;

wherein said correcting unit accesses said database and compares said first recognition pattern to said at least one recognition pattern stored in said database and suggests at least one default value for functions that contain an error.

11. The device according to claim 8 further comprising:

a training unit in said device;

wherein said training unit receives a plurality of digital signals, while concurrently processing a speech disposition command, and analyzes said plurality of digital signals to develop a recognition pattern for said digital signals.

12. The device with voice command interface according to claim 8 further comprising:

a print log mechanism for displaying status of said at least one function associated with said at least one speech disposition command.

* * * * *